(12) United States Patent
Yusa et al.

(10) Patent No.: US 8,168,098 B2
(45) Date of Patent: May 1, 2012

(54) METHOD OF INJECTION MOLDING THERMOPLASTIC RESIN USING SUPERCRITICAL FLUID AND INJECTION MOLDING APPARATUS

(75) Inventors: Atsushi Yusa, Ibaraki (JP); Yoshiyuki Nomura, Ibaraki (JP); Atsushi Yamada, Matsudo (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 233 days.

(21) Appl. No.: 11/598,054

(22) Filed: Nov. 13, 2006

(65) Prior Publication Data
US 2007/0108663 A1    May 17, 2007

(30) Foreign Application Priority Data
Nov. 14, 2005   (JP) .................................. 2005-328893

(51) Int. Cl.
*B29C 44/04* (2006.01)
*B29C 44/10* (2006.01)

(52) U.S. Cl. ................ 264/50; 264/328.17; 264/328.19; 264/DIG. 14

(58) Field of Classification Search .................... 264/50, 264/52, 55
See application file for complete search history.

(56) References Cited

U.S. PATENT DOCUMENTS

| | | | | |
|---|---|---|---|---|
| 4,255,368 A | * | 3/1981 | Olabisi | 264/45.5 |
| 5,194,195 A | * | 3/1993 | Okushima | 264/40.1 |
| 6,328,916 B1 | * | 12/2001 | Nishikawa et al. | 264/53 |
| 6,435,853 B1 | * | 8/2002 | Teraoka et al. | 425/4 C |
| 6,884,823 B1 | * | 4/2005 | Pierick et al. | 521/79 |
| 7,364,788 B2 | * | 4/2008 | Kishbaugh et al. | 428/304.4 |
| 2003/0168766 A1 | * | 9/2003 | Teraoka et al. | 264/50 |
| 2003/0228485 A1 | * | 12/2003 | Yusa et al. | 428/577 |
| 2005/0175849 A1 | | 8/2005 | Yusa et al. | |
| 2007/0166530 A1 | | 7/2007 | Yusa et al. | |

FOREIGN PATENT DOCUMENTS

| | | |
|---|---|---|
| CN | 1459366 A | 12/2003 |
| JP | 2625576 B | 4/1997 |
| JP | A-2004-218062 | 8/2004 |
| WO | WO 92/17533 | 10/1992 |

OTHER PUBLICATIONS

T. Hori, "Latest Applied Technology of Supercritical Fluid," NTS Inc., pp. 250-255, (2004).
Foreign Office Action issued Oct. 16, 2009 in Chinese Application No. 2006101470508 (with translation).
Foreign Office Action issued Sep. 16, 2010 in Chinese Application No. 2006101470508 (with translation).
Foreign Office Action mailed Feb. 22, 2011 in Japanese Application No. 2005-328893 (with translation).

* cited by examiner

*Primary Examiner* — Philip Tucker
*Assistant Examiner* — William Bell
(74) *Attorney, Agent, or Firm* — Oliff & Berridge, PLC

(57) ABSTRACT

The present invention provides an injection molding method capable of impregnating a supercritical fluid stably and partially in molten resin in a plasticizing cylinder of an injection molding apparatus. The above object is achieved by providing the method of injection molding which includes measuring a filling amount of the molten resin in the plasticizing cylinder, introducing a supercritical fluid into the molten resin in the plasticizing cylinder while moving back the screw by a predetermined distance without rotating the screw from a position of the screw at the time of completing the measuring, detecting a pressure of the molten resin, and determining based on the pressure an injection start position for the screw.

9 Claims, 10 Drawing Sheets

METHOD OF INJECTION MOLDING THERMOPLASTIC RESIN USING SUPERCRITICAL FLUID AND INJECTION MOLDING APPARATUS

BACKGROUND OF THE INVENTION

1. Field of the Invention

The present invention relates to a method of injection molding thermoplastic resin and an injection molding apparatus, and particularly relates to a method of injection molding and an injection molding apparatus, which performs the injection molding of thermoplastic resin after a supercritical fluid is impregnated in molten resin.

2. Description of the Related Art

In recent years, studies using supercritical fluids as solvent are actively conducted. A supercritical fluid has not only zero surface tension and a diffusive property equivalent to gas but also a function as solvent because a supercritical fluid has density close to liquid. As a technology using such physical properties of the supercritical fluid, there has been proposed a novel electroless plating method for plastic using the supercritical fluid (see, for example, "Latest Applied Technology of Supercritical Fluid", Teruo Hori, NTS Inc., pp. 250 to 255, 2004). The electroless plating method using the supercritical fluid is made to overcome problems as explained below in conventional technologies for forming an electroless plating film on plastic.

The electroless plating method is widely used as means for forming a metallic conductive film on a surface of an electronic apparatus composed of a plastic structure. Conventional electroless plating process for plastic differs slightly depending on materials or the like, but is generally constituted of processes through steps of molding resin, degreasing a molded article, etching, neutralizing and wetting, adding catalyst, activating catalyst, and electroless plating. Among the above electroless plating processes, a chromic acid solution, an alkaline metal hydroxide solution or the like is used in the etching step, but these etching solutions need post-treatment such as neutralizing and thus cause high costs. Further, in the etching step, a highly poisonous etchant is used, which is troublesome for handling. In Europe, RoHS (Restriction of the use of certain Hazardous Substances in electric and electronic equipment) Directive is established, which regulates certain hazardous chemical substances included in electric and electronic products, and material/part supply makers must assure that hexavalent chromium and the like are not included in new electric/electronic equipment to be released in the European market on and after Jul. 1, 2006. Under such a circumstance, it is an inevitable problem for conventional electroless plating processes for plastic, which has large environmental load, to be changed to alternative technologies.

In comparison to the above electroless plating processes having an etching step, in the method described in "Latest Applied Technology of Supercritical Fluid", Teruo Hori, NTS Inc., pp. 250 to 255, 2004, it is possible to impregnate organic metal complexes in the surface of the polymer by dissolving the organic metal complexes in a supercritical carbon dioxide, and bringing the supercritical carbon dioxide into contact with various polymers. Then, the organic metal complexes impregnated in the polymer are reduced by heating, chemical reduction processing, or the like to thereby allow separation of metallic fine particles. Accordingly, the entire surface of the polymer can be subjected to electroless plating. According to this process, it is said that waste liquid treatment is not required, and plastic having favorable surface roughness can be obtained.

Furthermore, conventionally there is foam molding as an injection molding process which uses the supercritical fluid and is actually industrialized (see, for example, Japanese Patent No. 2625576). In this process, an inert gas such as $N_2$ and $CO_2$ can be used as a foaming agent instead of conventional chemical foaming agents, and the inert gas is mixed and kneaded in a supercritical state with molten resin. This mixing and kneading step is performed when a resin material is plasticized and measured using a screw in a plasticizing cylinder, while stirring the resin material to be plasticized and melted and a supercritical fluid of $N_2$, $CO_2$ or the like by the screw.

SUMMARY OF THE INVENTION

Since the electroless plating method using the supercritical fluid disclosed in the above "Latest Applied Technology of Supercritical Fluid", Teruo Hori, NTS Inc., pp. 250 to 255, 2004 is batch processing, continuous production for the purpose of industrialization is difficult for continuous production. Further, since the surface of the polymer is soften by the supercritical carbon dioxide or the like, and then the supercritical fluid and metal complexes as modifying materials are impregnated in the polymer, the molded article becomes soft, and thus it may be difficult to maintain the shape thereof.

Further, in the conventional foam molding or the like, when the supercritical fluid is impregnated in molten resin inside the plasticizing cylinder, it is possible to impregnate the supercritical fluid in the entire molten resin. However, it is difficult to impregnate the supercritical fluid in a portion of an injection-molded article in the conventional foam molding or the like. Furthermore, in the conventional foam molding or the like, a screw position after plasticizing and measuring the molten resin is stopped at a predetermined screw position, similarly to typical injection molding. Then, there is adopted a method to control the internal pressure of the molten resin by maintaining a back pressure in a direction of advancing the screw at a certain pressure while fixing the stopped screw position. Accordingly, the method poses a problem of incapability to respond to a case that a supercritical fluid separates from the inside of molten resin, and thus the internal pressure of the molten resin becomes lower than the back pressure.

The present invention is made to solve the above problems, and a first object of the present invention is to apply a surface modification method for plastic using a supercritical fluid as solvent to an injection molding process, and in particular to apply a process which impregnates metal complexes in thermoplastic resin using the supercritical fluid to modify a surface, namely a clean pre-treatment process for electroless plating, to the injection molding process. Further, a second object of the present invention is to provide a novel process capable of stably impregnating the supercritical fluid partially in molten resin in the plasticizing cylinder of the injection molding apparatus.

According to a first aspect of the present invention, there is provided a method of injection molding using an injection molding apparatus including a mold and a plasticizing cylinder having a screw, the plasticizing cylinder injecting molten resin of thermoplastic resin into the mold by the screw, the method including:

measuring a filling amount of the molten resin in the plasticizing cylinder;

introducing a supercritical fluid into the molten resin in the plasticizing cylinder while moving back the screw by a predetermined distance without rotating the screw from a position of the screw at the time of completing the measuring;

detecting a pressure of the molten resin; and determining based on the pressure an injection start position for the screw.

According to the injection molding method of the present invention, by moving back (sucking back) the screw by a predetermined distance without rotating the screw after the molten resin is plasticized and measured, the density and the internal pressure of the molten resin lowers at an area closer to the cavity with respect to a tip portion of the screw. Accordingly, the supercritical fluid can be introduced into the molten resin in which the internal pressure has lowered. Namely, the supercritical fluid can be introduced at the same time as the sucking back. Accordingly, it is also possible to introduce the supercritical fluid into a portion, of the molten resin, in which a center thereof is the vicinity of an introducing portion of the supercritical fluid. Noted that in the injection molding method of the present invention, a introducing position of the supercritical fluid in the plasticizing cylinder is arbitrary as long as the position exists in a front side (a side of the cavity) of the tip portion of the screw after the plasticizing is completed. Then, the pressure of the molten resin is detected, and the pressure is fed back to control the position of the screw to determine the injection start position. Namely, in the injection molding method of the present invention, the injection start position for the screw is determined based on the pressure of the molten resin after the supercritical fluid is introduced into the molten resin. Accordingly, the molten resin can be injected in a state that the pressure of the molten resin is stable at a predetermined pressure. Therefore, the injection molding can be performed while preventing separation of the supercritical fluid from the inside of the molten resin.

Note that a method of determining the injection start position for the screw based on the pressure of the molten resin not only includes directly detecting a pressure (internal pressure of resin) applied to an inner wall of an area inside the plasticizing cylinder in which the molten resin, in which the supercritical fluid is introduced, is filled, to determine the injection start position for the screw, but also includes indirectly detecting the pressure of the molten resin, to determine the injection start position for the screw based on the detected pressure. For example, a relationship of the internal pressure of resin and the pressure (back pressure) applied to the screw may be checked in advance, and then the pressure applied to the screw may be controlled so as to be a predetermined pressure (back pressure control) to thereby determine the injection start position for the screw, or the injection start position for the screw may be determined based on a differential pressure between the internal pressure of the resin and the pressure inside the mold. Further, the injection start position for the screw may be determined based on both the pressure of the molten resin which is detected indirectly and the pressure of the molten resin which is detected directly.

As the method of determining the injection start position for the screw based on the pressure of the molten resin in the injection molding method of the present invention, following methods are preferable.

As a first method, first, after a supercritical fluid is introduced into the plasticizing cylinder at the same time as the suck back, the screw is advanced to pressurize molten resin while the pressure of the molten resin is detected (feedback controlled), and the supercritical fluid is impregnated in a portion, of the molten resin, in which the center thereof is the vicinity of an introducing portion of the supercritical fluid. Then, the screw is stopped when the detected pressure of the molten resin becomes a predetermined value, and the position where the screw is stopped is determined as the injection start position. In this method, since the molten resin is pressurized by advancing the screw, the internal pressure of the resin becomes stable as compared to conventional methods, and the supercritical fluid can be impregnated stably in the molten resin while preventing separation of the supercritical fluid and the molten resin.

As a second method, the injection start position for the cylinder may be determined based on a differential pressure between the pressure of the molten resin in the plasticizing cylinder and the pressure inside the mold. According to a verification test conducted by the present inventors, it was found that, when the differential pressure between the pressure of the molten resin in the plasticizing cylinder just before the injection filling and the pressure inside the mold is too large, it becomes difficult to prevent foaming in the molded article, while when the differential pressure is too small, filling of the resin into the mold becomes difficult. Therefore, in order to obtain a molded article having a better surface characteristic (having no foams or the like), it is preferable that the differential pressure between the pressure of the molten resin in the plasticizing cylinder and the pressure inside the mold is set to an appropriate value. For example, when a counter pressure is applied in the mold at the time of injection molding, it is preferable that the differential pressure between the pressure of the molten resin in the plasticizing cylinder and the pressure inside the mold is set to 1 MPa to 10 MPa, more preferably 1 MPa to 5 MPa.

In the above second method, when the supercritical fluid is impregnated in the molten resin, it is desirable in terms of improving the productivity that the supercritical fluid is impregnated in a short period of time in a state that the pressure is high in the resin, but it is also desirable that the pressure of the molten resin in the plasticizing cylinder before the injection filling is reduced as much as possible. When a counter pressure is applied to the mold, reduction of the pressure of the molten resin in the plasticizing cylinder allows reduction of the counter pressure, thereby reducing load to a seal mechanism of the mold. Further, by reducing the pressure of the molten resin as much as possible in the plasticizing cylinder before the injection filling, the differential pressure between the pressure of the molten resin in the plasticizing cylinder and the pressure inside the mold can be set to a predetermined value without using the counter pressure. On the other hand, when the supercritical fluid is impregnated in the molten resin, it is desirable in terms of improving the productivity that the supercritical fluid is impregnated in a short period of time in a state that the pressure is high in the resin.

Accordingly, as a method of determining the injection start position by reducing the pressure of the molten resin after the supercritical fluid is impregnated by the second method, a method as follows is preferable. After the supercritical fluid is impregnated, the pressure of the molten resin is reduced by rotating the screw in reverse or the like, and when the pressure of the molten resin becomes a predetermined value (the differential pressure between the pressure of the molten resin in the plasticizing cylinder and the pressure inside the mold becomes a predetermined value), the cylinder is stopped and the position thereof is determined as the injection start position. Further, as another method, the plasticizing and measuring is stopped once and in this state the supercritical fluid is impregnated under a high pressure condition, and thereafter the plasticizing and measuring is restarted with a low back pressure to reduce the pressure of the molten resin and to move the screw to the injection start position. When using the methods as described above, the pressure of the molten resin in the plasticizing cylinder can be lowered immediately before the injection filling to thereby reduce the differential pressure between the pressure of the molten resin in the plasticizing cylinder and the pressure inside the mold. When the molten resin is injected in such a state, a molded article having an excellent surface characteristic can be molded.

As described above, when the first method is used as the method of determining the injection start position for the screw based on the pressure of the molten resin in the injection molding method of the present invention, the supercritical fluid is introduced and then pressurized, and the screw is stopped when the pressure of the molten resin reaches the predetermined value, thereby determining the stopping position of the screw as the injection start position. On the other hand, in the second method, the supercritical fluid is introduced and then pressurized and the screw is stopped when the pressure of the molten resin reaches the predetermined value similarly to the first method, and thereafter the screw is controlled so that the molten resin is depressurized to a predetermined pressure, thereby determining the injection starting position. According to observation by the present inventors, it was found that the supercritical fluid introduced into the plasticizing cylinder separates from the molten resin or the supercritical fluid exists nonuniformly in the molten resin, and thus the internal pressure of the resin in which the supercritical fluid is introduced, fluctuates and is not always constant. Therefore, in both the above first and second methods, in many cases, the position where the screw is stopped when the supercritical fluid is pressurized is different in each shot. Namely, in both the first and second methods, in many cases, the injection start position is different in each shot, and is also different from the measurement completing position for the screw.

The injection molding method of the present invention may further include advancing the screw from the injection start position to inject the molten resin into the mold, wherein movement of the screw during the advancing may be stroke-controlled.

In the injection molding method of the present invention, as described above, since there is a possibility that the injection starting position for the screw varies in each shot, it is preferable that a moving distance for the screw is stroke-controlled when the screw is advanced further from the injection start position to inject and fill the molten resin in the cavity. Namely, at the time of first injection filling, although a moving speed for the screw is controlled by switching the speed in multi-stepped manner, in this control, the screw is controlled not by conventional position control (a control method in which the screw is moved from the injection start position to a predetermined position) but by a movement stroke (a control method in which the screw is moved from the injection start position by a predetermined distance). Accordingly, a first filling amount can be constant even when the injection start position varies.

In the injection molding method of the present invention, the supercritical fluid may include a functional material. By injection molding the molten resin in which the supercritical fluid including the functional material is impregnated, at least a portion (surface or inside) of resin (molded article) can be modified by the functional material.

Note that as the functional material to be dissolved or dispersed in the supercritical fluid, any material may be used as long as this material can be dissolved or dispersed in a supercritical fluid such as supercritical carbon dioxide. For example, when a dye is used as the functional material, the surface or the inside of the thermoplastic resin can be dyed. When a polyalkyl glycol is used as the functional material, a hydrophilic thermoplastic resin can be obtained. When silicon oil or a fluorine compound is used as the functional material, a hydrophobic thermoplastic resin can be obtained.

Further, when a metal complex or a metal alkokide is used as the functional material, the thermoplastic resin can include metallic fine particles.

In the injection molding method of the present invention, the supercritical fluid may be introduced into a flow-front portion of the molten resin in the plasticizing cylinder. Note that the "flow-front portion of the molten resin in the plasticizing cylinder" in this description means an area in the vicinity of a mold-introducing portion on the side of the nozzle tip within an area inside the plasticizing cylinder where the molten resin is filled, and is an area of the molten resin to be introduced initially into the inside of the mold (cavity) at the time of injection molding.

By impregnating the supercritical fluid and the functional material dissolved or dispersed therein in the flow-front portion of the molten resin in the plasticizing cylinder, at least a portion of the surface of the molded article can be modified by the functional material. The flow-front portion is a portion of the molten resin to be introduced initially into the mold at the time of injection molding, and when the first filling of the molten resin into the cavity is performed, the molten resin of the flow-front portion is concentrated onto the surface of the mold by a fountain flow effect. As a result, a skin layer (layer of molten resin including the functional material) is formed in a surface portion of the molded article. Therefore, by just impregnating the supercritical fluid including the functional material in the vicinity of the mold-introducing portion (flow-front portion) of the molten resin which is plasticized and measured and staying between the nozzle tip that is the mold-introducing portion and the screw, a molded article in which the functional material is dispersed in a surface thereof can be produced.

In the injection molding method of the present invention, the functional material may be metallic fine particles. By using the metal complex or the like as a precursor and dispersing the metallic fine particles in the thermoplastic resin, effects such as low thermal expansion are obtained, whereby the thermoplastic resin can have properties close to those of inorganic materials. Further, by dispersing the metallic fine particles in the surface of the thermoplastic resin, the metallic fine particles can become catalyst cores for a plating film. Therefore, when the metallic fine particles are dispersed in the surface of the thermoplastic resin, a metallic film can be formed on the surface of the thermoplastic resin by the electroless plating method. Further, in the injection molding method of the present invention, thermally unstable metallic precursors dissolved and dispersed in a supercritical fluid are introduced in the plasticizing cylinder having high temperature, and thus the metal complex can be easily subjected to heat reduction in a short period of time to convert into metallic fine particles.

Note that the metal complex that can be used in the injection molding method of the present invention, is arbitrary, and for example bis (cyclopentadienyl) nickel, bis (acetylacetonate) palladium (II), dimethyl (cyclooctadienyl) platinum (II), hexafluoro acetylacetonate palladium (II), hexafluoro acetylacetonate hydrate copper (II), hexafluoro acetylacetonate platinum (II), hexafluoro acetylacetonate (trimethyl phosphine) silver (I), dimethyl (heptafluoro octanedionate) silver (AgFOD), or the like can be used.

The injection molding method of the present invention may include applying one of a predetermined counter pressure, a dwell pressure and a clamping pressure to an inside of the mold when the molten resin is injected into the mold. After the supercritical fluid is introduced into the molten resin , when the molten resin is injected and filled in the mold while the supercritical fluid impregnated in the molten resin is discharged by gasifying, the counter pressure, the dwell pressure, the clamping pressure or the like is applied to the inside of the mold. Accordingly, rapid decreasing of the internal pressure of the molten resin can be prevented, thereby preventing foaming in the surface and the inside of the molded article. Further, the injection molding method of the present invention may include applying a dwell pressure to the molten resin after the molten resin is filled in the mold. By applying the dwell pressure to the molten resin after the molten resin is filled in the mold, foaming in the molded article can be prevented. By impregnating a necessary amount of the supercritical fluid in a portion of the molten resin at the time of a surface modification or the like, a molded article having no foam can be formed easily.

Further, in the injection molding method of the present invention, when the molten resin is injected into the mold, an internal pressure of the resin may be decreased to foam at least a portion of a molded article. By impregnating the supercritical fluid only in a core portion of the molded article, it is possible to injection mold an internally foamed body having an excellent surface characteristic.

In the injection molding method of the present invention, any material may be used as the thermoplastic resin in which the supercritical fluid is impregnated, and for example thermoplastic resin such as synthetic fiber of polyester or the like, polypropylene, polymethyl methacrylate, polycarbonate, amorphous polyolefin, polyetherimide, polyethylene telephthalate, ABS resin, polyamideimide, polylactic acid, nylon resin, and the like, and a composite material thereof can be used. Also, resin materials in which various types of inorganic fillers or the like such as glass fiber, carbon fiber, nano-carbon are mixed and kneaded, can also be used.

As the supercritical fluid which may be used in the injection molding method of the present invention, air, CO, $CO_2$, $O_2$, $N_2$, $H_2O$, methane, ethane, propane, butane, pentane, hexane, methanol, ethyl alcohol, acetone, diethyl ether, and the like in a supercritical state may be used. The critical temperature of $N_2$ is $-147°$ C. and the critical pressure thereof is 34 bars, and the critical temperature of $H_2O$ is $374°$ C. and the critical pressure thereof is 218 bars, while the critical temperature of $CO_2$ is $31°$ C. and the critical pressure thereof is 73 bars. $CO_2$ has the solubility equivalent to that of n-hexane. Further, $CO_2$ acts as plasticizer for various thermoplastic resin materials, and thus has a great performance in injection molding and extrusion molding. In this viewpoint, as the supercritical fluid that can be used in the injection molding method of the present invention, $CO_2$ is particularly preferable. Further, one kind of the supercritical fluids listed above may be used independently, or two or more kinds thereof may be mixed and used.

According to a second aspect of the present invention, there is provided a method of forming a plating film on thermoplastic resin, the method including:

molding, by the method of injection molding according to the first aspect, thermoplastic resin in which metallic fine particles are dispersed in a surface of thermoplastic resin; and forming a plating film by an electroless plating method on the surface of the thermoplastic resin in which the metallic fine particles are dispersed.

As described above, in the injection molding method of the present invention, by impregnating the supercritical fluid including the metal complexes in the flow-front portion of the molten resin, the metallic fine particles can be dispersed as catalyst cores for a plating film in the surface of the thermoplastic resin (molded article). Accordingly, a metal film can be formed easily by the electroless plating method on the surface of the thermoplastic resin. Therefore, according to the plating film forming method of the present invention, a plating film can be formed by the electroless plating method on a surface of a molded article having a complicated shape at the same time as injection molding.

The inventors of the present invention found that, when metallic fine particles as catalyst cores for electroless plating are dispersed in the entire surface of a molded article by the above-described injection molding method of the present invention, the metallic fine particles are dispersed in an island shape, and the metallic fine particles can be distributed without having conductivity in the surface of the molded article. Therefore, when forming a plating film by the electroless plating method on the surface of the molded article after the metallic fine particles are dispersed in the surface of the molded article using the injection molding method of the present invention, a plane and three-dimensional electric wiring formed of the plating film can be formed easily on the molded article by masking an arbitrary portion on the molded article. The method of masking is arbitrary, and for example, the masking can be performed by means of a resist pattern using photolithography, an ink pattern made by screen printing or an inkjet method, a masking tape, and the like.

According to a third aspect of the present invention, there is provided an injection molding apparatus, comprising:

a mold:

a plasticizing cylinder which has a screw and injects a molten resin of thermoplastic resin into the mold by the screw;

a supercritical fluid introducing unit which introduces a supercritical fluid into the molten resin in the plasticizing cylinder; and a position determining unit which determines an injection start position for the screw based on a pressure of the molten resin, in which the supercritical fluid has been introduced, in the plasticizing cylinder.

In the injection molding apparatus of the present invention, the position determining unit may include a pressure detector which detects the pressure of the molten resin.

According to the injection molding method of the present invention, the pressure of the molten resin in the plasticizing cylinder is detected after the supercritical fluid is introduced into at least a portion of the molten resin, and the injection start position for the screw is determined based on the detected pressure. Accordingly, the molten resin can be injected in a state that the internal pressure of the resin is stable as compared to conventional methods. Therefore, the supercritical fluid can be impregnated stably and partially in the molten resin while preventing separation of the supercritical fluid and the molten resin.

Further, in the injection molding method of the present invention, when the metal complex is used as the functional material, by impregnating the supercritical fluid including the metal complexes in the flow-front portion of the molten resin, the metallic fine particles can be dispersed as catalyst cores for a plating film in the surface of the thermoplastic resin (molded article). Therefore, in this case, the injection molding method of the present invention can be applied particularly as a clean pre-treatment process for electroless plating.

DETAILED DESCRIPTION OF THE PREFERRED EMBODIMENTS

Hereinafter, embodiments of an injection molding method and a method of forming a plating film using the injection molding method of the present invention will be explained with reference to the drawings, but the present invention is not limited to these embodiments.

Embodiment 1

In Embodiment 1, a supercritical fluid including metal complexes was impregnated in a flow-front portion of molten resin, and the molten resin was injection molded so that metallic fine particles to be catalyst cores for a plating film are dispersed in a surface of thermoplastic resin. Then, a plating film was formed on a surface of the molded article by an electroless plating method. In this embodiment, supercritical carbon dioxide (carbon dioxide in a supercritical state) was used as the supercritical fluid. As metal complexes to be dissolved in the supercritical carbon dioxide, hexafluoro acetylacetonate palladium (II) metal complexes are used. Also, as the thermoplastic resin, polycarbonate including 10%-glass fiber is used.

Plastic Injection Molding Apparatus

Figure 1:
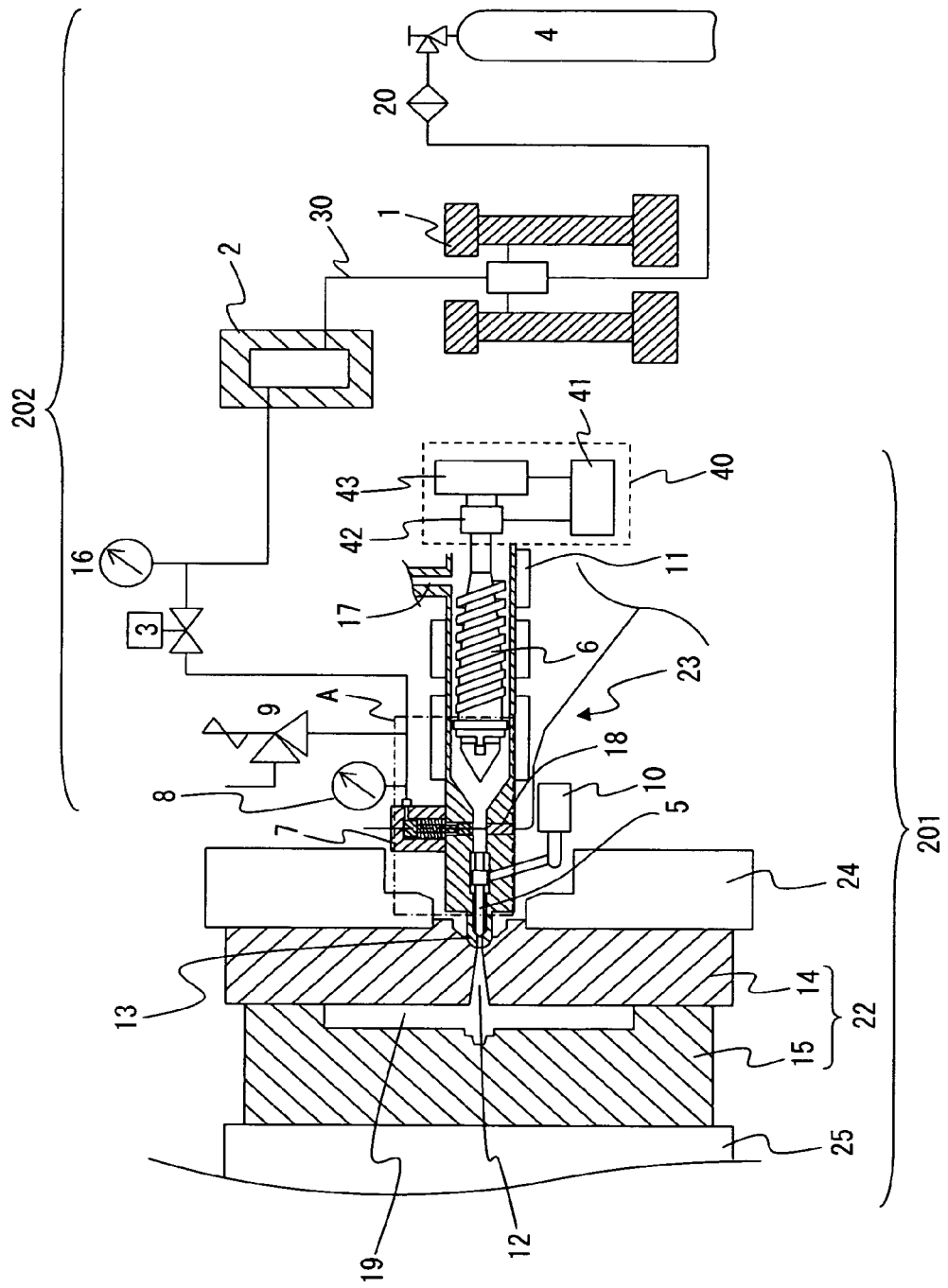
FIG. 1 is a schematic configuration diagram of an apparatus used in an injection molding method of Embodiment 1.

A schematic configuration of a plastic injection molding apparatus used in Embodiment 1 is shown in FIG. 1. As shown in FIG. 1, the plastic injection molding apparatus used in this embodiment includes an injection molding section 201 and a supercritical fluid generating section 202.

As shown in FIG. 1, the injection molding section 201 includes mainly a plasticizing cylinder 23 for injecting molten resin, a movable platen 25, a movable mold 15 attached to the movable platen 25, a fixed platen 24, a fixed mold 14 attached to the fixed platen 24 and a position determining unit 40 for determining an injection start position for a screw 6 based on a back pressure of the screw 6. In a mold 22, the fixed mold 14 and the movable mold 15 are pressed against each other to form a cavity 19 which has a disc shape and has a spool 12 at a center thereof. Further, the injection molding section 201 in this embodiment is constructed such that the movable platen 25 and the movable mold 15 open/close in a left and right direction on the drawing in conjunction with a not-shown electric toggle clamping mechanism. Further, as shown in FIG. 1, a gas introducing mechanism 7 (a supercritical fluid introducing unit) is provided on a side portion of a flow-front portion of the plasticizing cylinder 23. Also, as shown in FIG. 1, the position determining unit 40 includes a controller 41 and a load cell motor which has a load cell 42 (pressure detector) and an electric motor 43. The other structure is similar to a conventional injection molding apparatus.

As shown in FIG. 1, the supercritical fluid generating unit section includes mainly a carbon dioxide bottle 4, a filter 20, a continuous flow system 1 constituted of two publicly-known syringe pumps (E-260 made by Teledyne ISCO, Inc.), and a dissolving tank 2 for dissolving metal complexes into a supercritical fluid, and the respective components are connected by a pipe 30. Further, as shown in FIG. 1, the dissolving tank 2 is connected to the gas introducing mechanism 7 of the injection molding section 201 via an automatic valve 3.

Injection Molding Method

First, a method of generating the supercritical carbon dioxide and dissolving metal complexes will be explained. Liquid carbon dioxide of 5 MPa to 7 MPa stored in the carbon dioxide bottle 4 is introduced into the continuous flow system 1 via the filter 20. Then, in at least one of the syringe pumps in the continuous follow system 1, the pressure of the introduced carbon dioxide is constantly increased to and kept at a predetermined pressure (10 MPa), thereby generating the supercritical carbon dioxide. Then, the supercritical carbon dioxide generated in the continuous follow system 1 is introduced constantly into the dissolving tank 2. In the dissolving tank 2 raised in temperature to 40° C., hexafluoro acetylacetonate palladium (II) metal complexes are placed so that it is supersaturated, and the metal complexes are constantly saturated and dissolved in the supercritical carbon dioxide introduced from the continuous flow system 1. At this time, a pressure meter 16 of the dissolving tank 2 displays 10 MPa.

Figure 5:
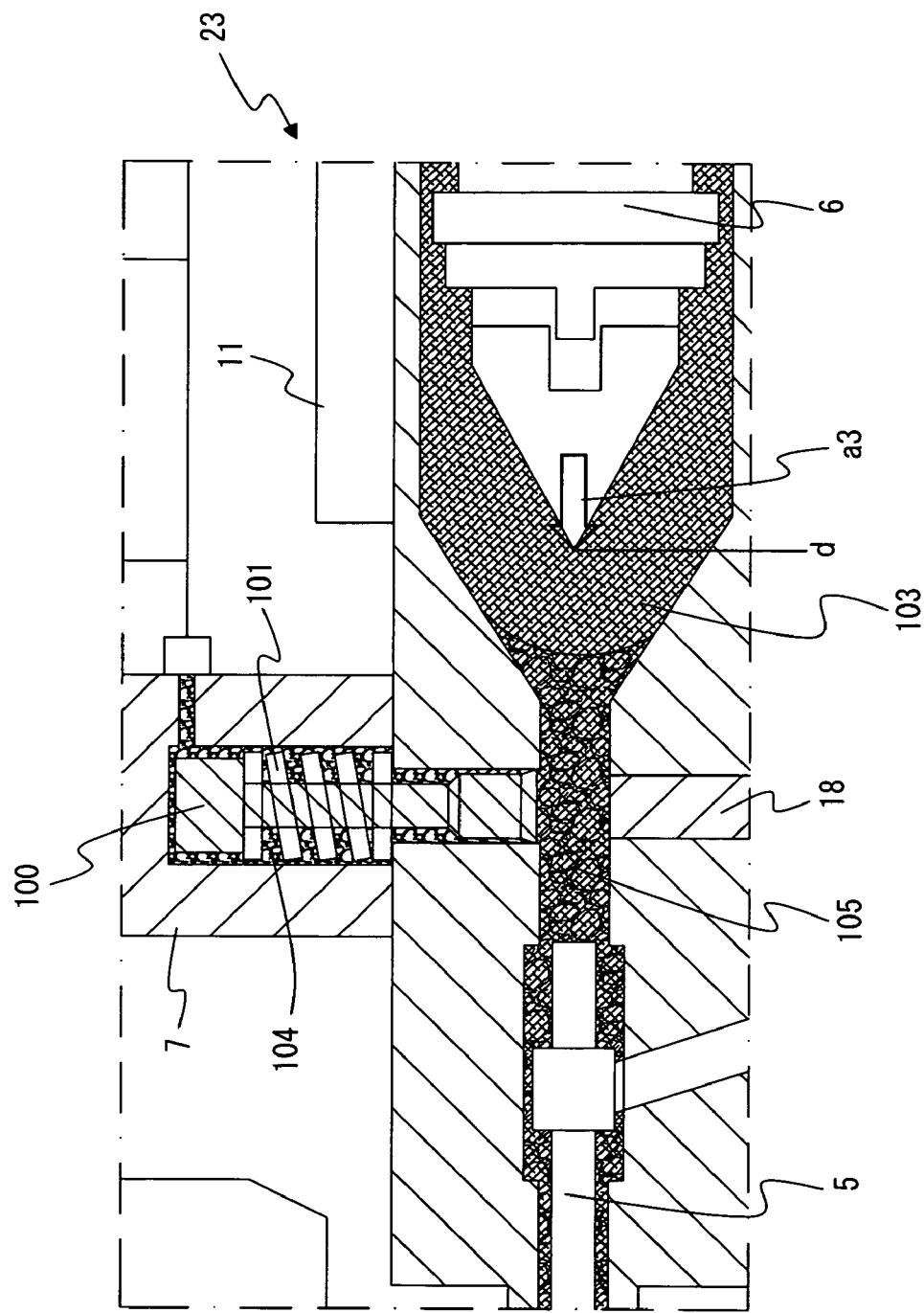
FIG. 5 is an enlarged view of the portion A surrounded by the dashed line in FIG. 1, and is a view for explaining the method of introducing the supercritical fluid into the plasticizing cylinder.
Figure 6:
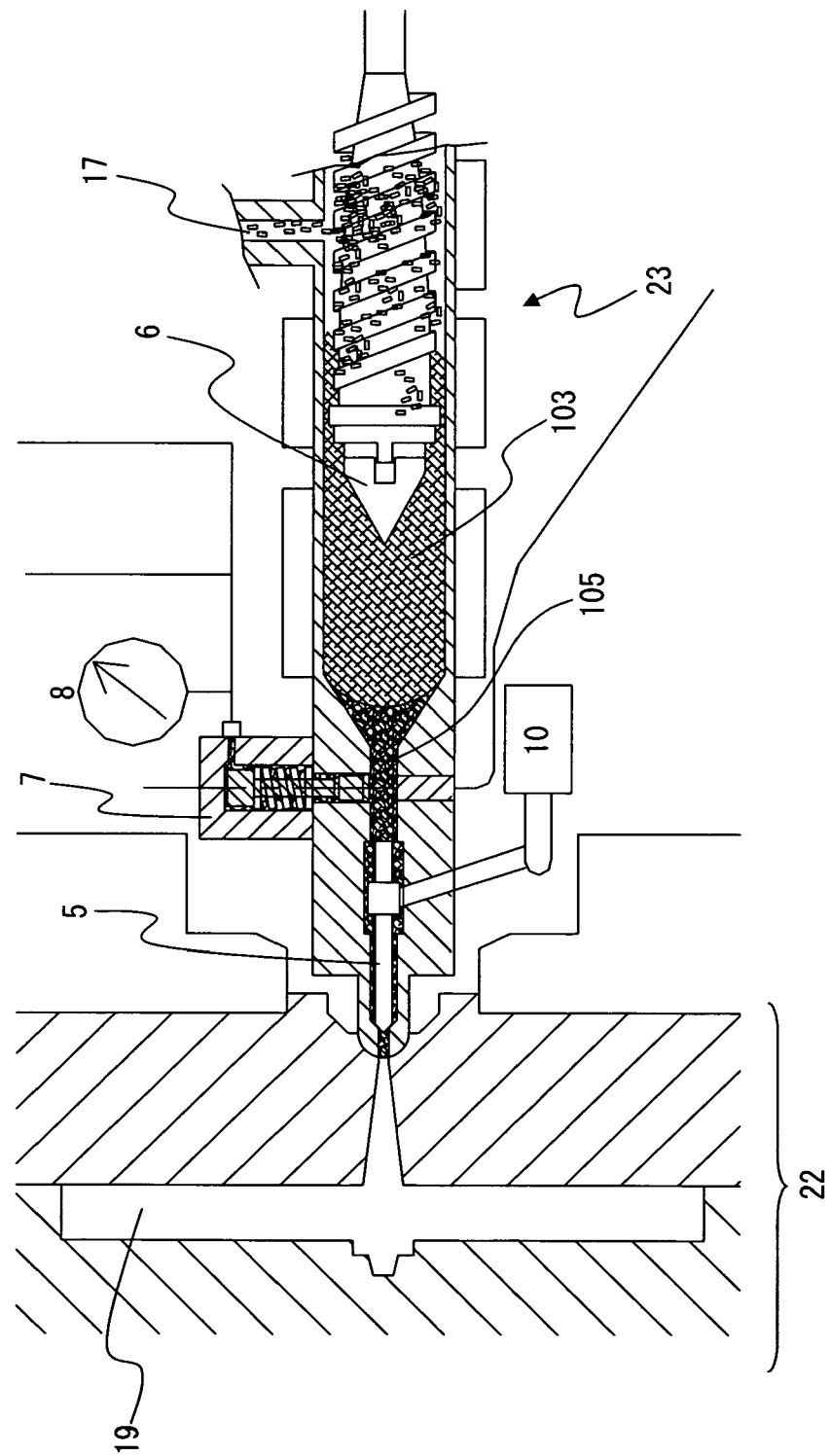
FIG. 6 is an enlarged view of an injection molding section of the apparatus used in Embodiment 1, and is a view for explaining a method of injecting molten resin into a cavity.
Figure 7:
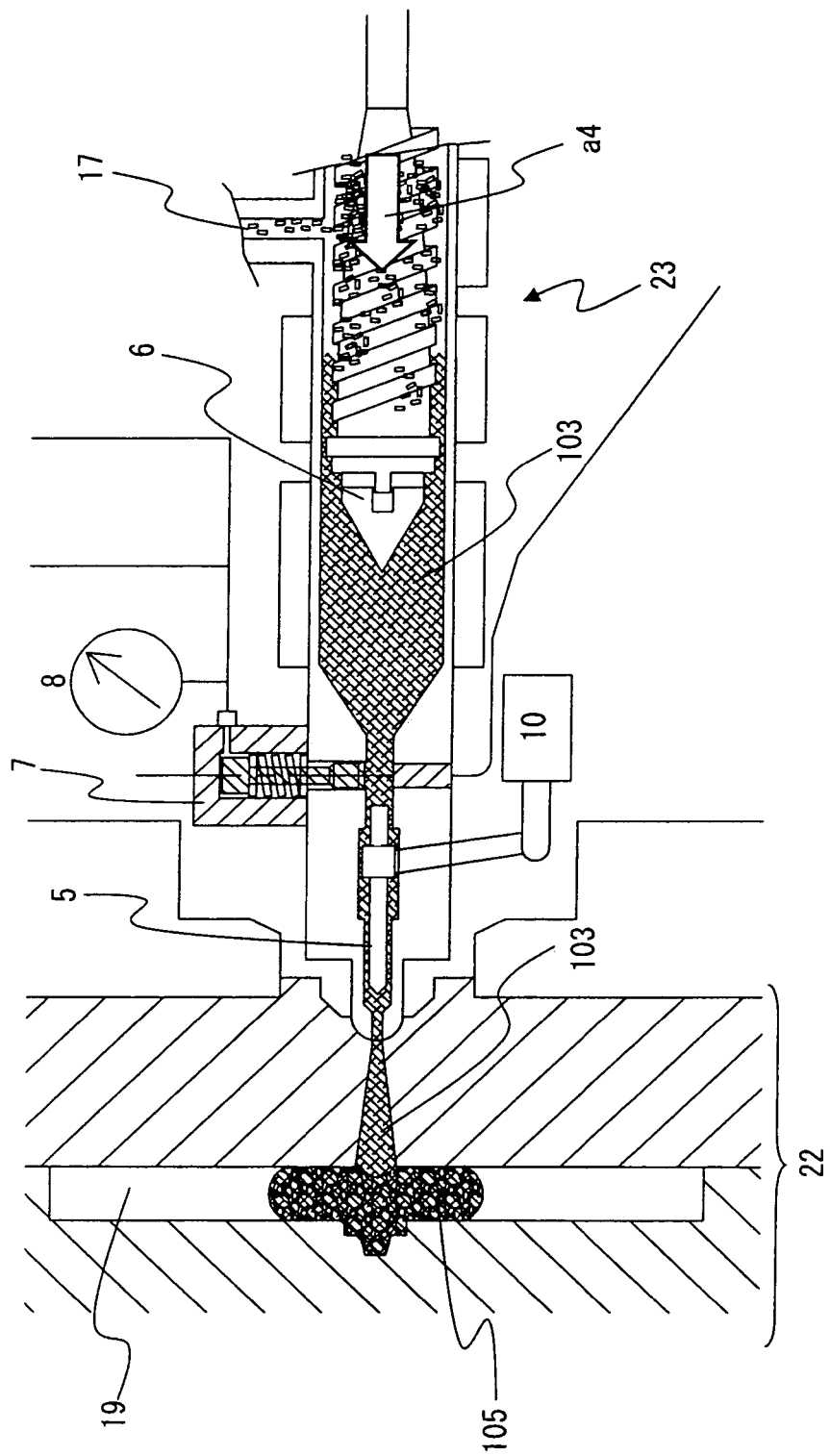
FIG. 7 is an enlarged view of the injection molding section of the apparatus used in Embodiment 1, and is a view for explaining the method of injecting the molten resin into the cavity.
Figure 8:
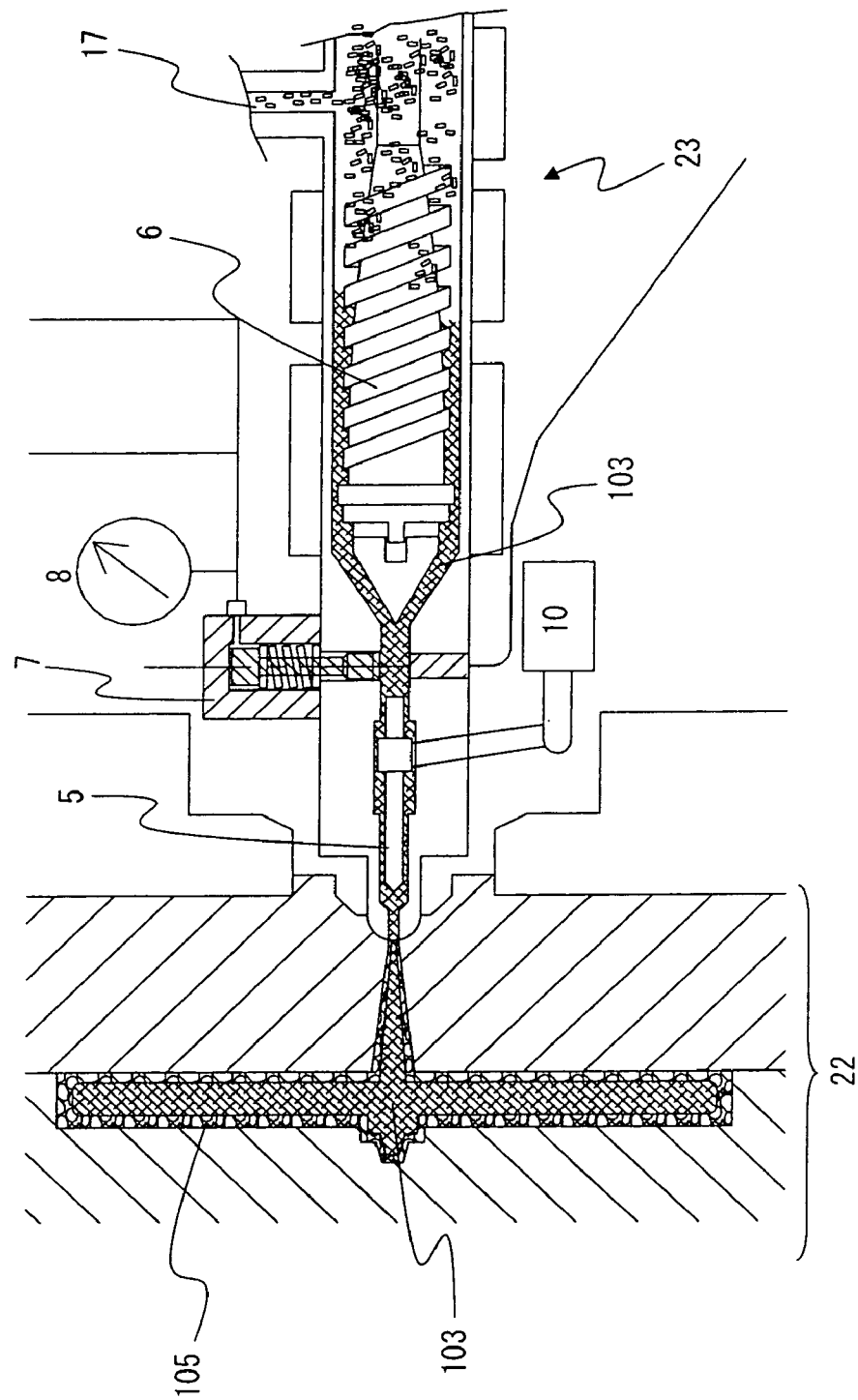
FIG. 8 is an enlarged view of the injection molding section of the apparatus used in Embodiment 1, and is a view for explaining the method of injecting the molten resin into the cavity.

Next, the method of injection molding thermoplastic resin in this embodiment will be explained with reference to FIGS. 1 to 8 and 10. FIGS. 2 to 5 are enlarged views of an area surrounded by a dashed line A in FIG. 1, and are views for explaining operations of a screw and steps of introducing the supercritical carbon dioxide until immediately before injecting the molten resin into the cavity in the mold. On the other hand, FIGS. 6 to 8 are enlarged views of the injection molding section 201, and are views showing how functional materials (metal complexes) included in the supercritical carbon dioxide are dispersed in a surface of a molded article when molding the molten resin by injection into the cavity inside the mold.

Figure 2:
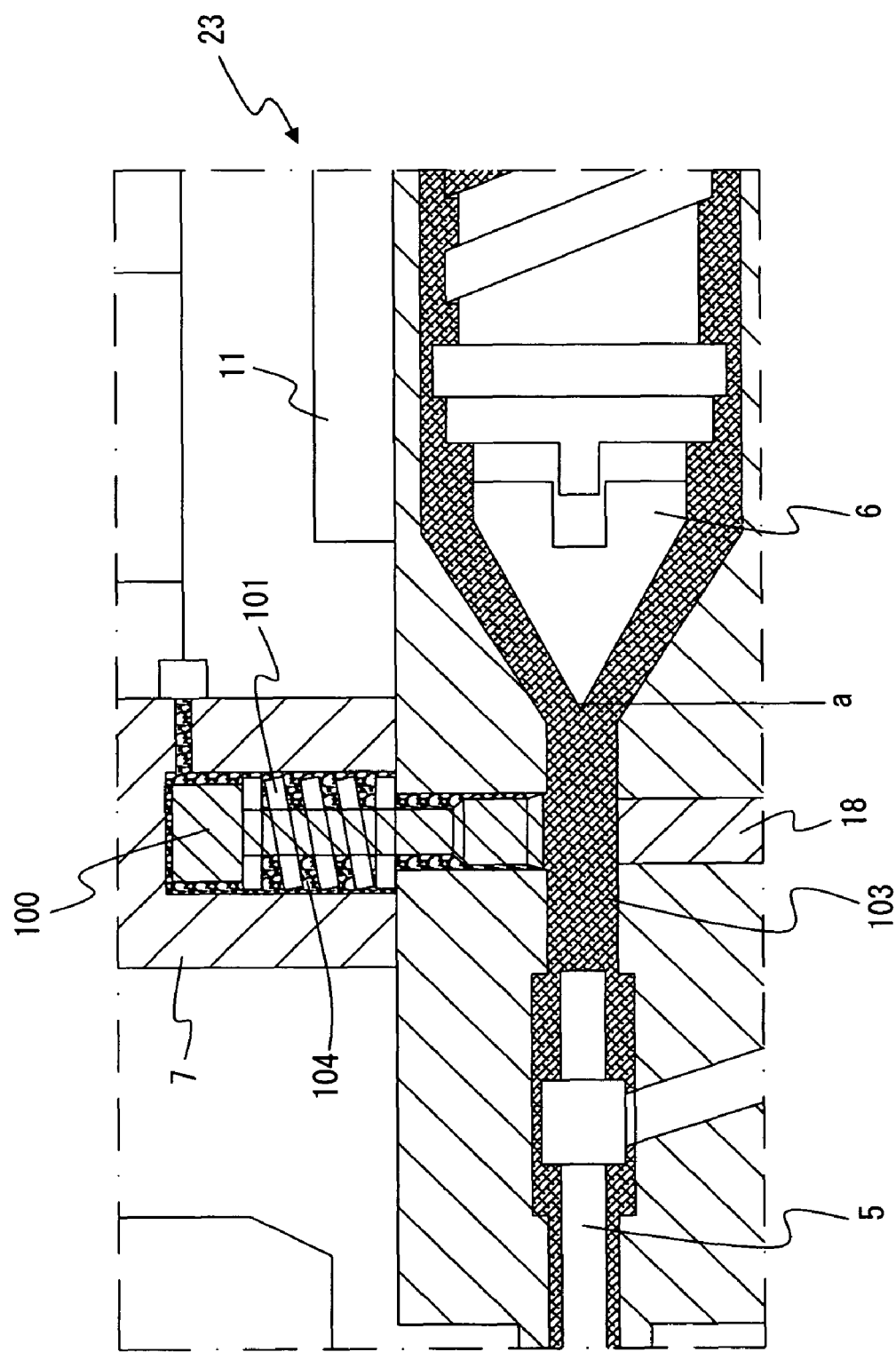
FIG. 2 is an enlarged view of a portion A surrounded by a dashed line in FIG. 1, and is a view for explaining a method of introducing a supercritical fluid into a plasticizing cylinder.

First, as in conventional arts, a resin material was plasticized as follows. The plasticizing cylinder 23 is raised in temperature to 300° C. by a band heater 11, and pellets (not shown) to be the resin material are dried and dehydrated by a dryer (not shown) and thereafter supplied into the plasticized cylinder 23 via a hopper and an introducing port 17. Similarly to plasticization in conventional injection molding, the resin pellets are passed through the inside of a screw trench by rotation of a screw 6 to be pushed in a forward direction (side of the cavity) of the screw 6 while plasticizing and melting resin pellets. Then, by the plasticized molten resin pushed in the forward direction of the screw 6, the internal pressure of the resin is increased. As a result, the screw 6 moves back, and measurement is started. At this time, a nozzle tip 13 of the plasticizing cylinder 23 is closed by a shut-off pin 5 so that the resin does not leak. The shut-off pin 5 is driven by the force of an air driving piston 10. Further, in the injection molding section 201 of this embodiment, as shown in FIG. 2, a resin pressure sensor 18 is provided at a position facing the gas introducing mechanism 7, and the internal pressure of the resin which exists immediately beneath of the gas introducing mechanism 7, was measured by the resin pressure sensor 18.

Next, after completing plasticization of the molten resin, the supercritical carbon dioxide was introduced by the gas introducing mechanism 7 as follows. Note that the state in FIG. 2 is a state at the time when previous injection molding is completed, and is a state that molten resin 103 is filled in the plasticizing cylinder 23. Further, in the state in FIG. 2, a seal piston 100 of the gas introducing mechanism 7 blocks the interface between the supercritical carbon dioxide 104 and the molten resin 103. Note that after previous injection is completed, it is assumed that a tip of the screw 6 has reached a furthest advancing position "a" as shown in FIG. 2.

Here, the operation principle of the gas introducing mechanism 7 will be explained. A tip of the seal piston 100 of the gas introducing mechanism 7 is arranged at a position to block the interface between the supercritical carbon dioxide 104 and the molten resin 103 as shown in FIG. 2 by an elastic force of a spring 101 and the pressure P2 of the resin, when a differential pressure (P1−P2) between the pressure P1 of the supercritical carbon dioxide 104 in the gas introducing mechanism 7 and the internal pressure P2 of the molten resin 103 measured by the resin pressure sensor 18, is 5 MPa or lower. Thus, the inside of the gas introducing mechanism 7 and the inside of the plasticizing cylinder 23 are blocked from each other. When the pressure P1 of the supercritical carbon dioxide inside the gas introducing mechanism 7 increases sufficiently higher than the internal pressure P2 of the resin so that P1−P2≧5 MPa, the seal piston 100 moves downward (moves toward the resin pressure sensor 18 in FIG. 2). The gas introducing mechanism 7 is constructed such that the seal is thus released, and the supercritical carbon dioxide 104 with high pressure flows toward the molten resin 103 to be impregnated therein.

Figure 3:
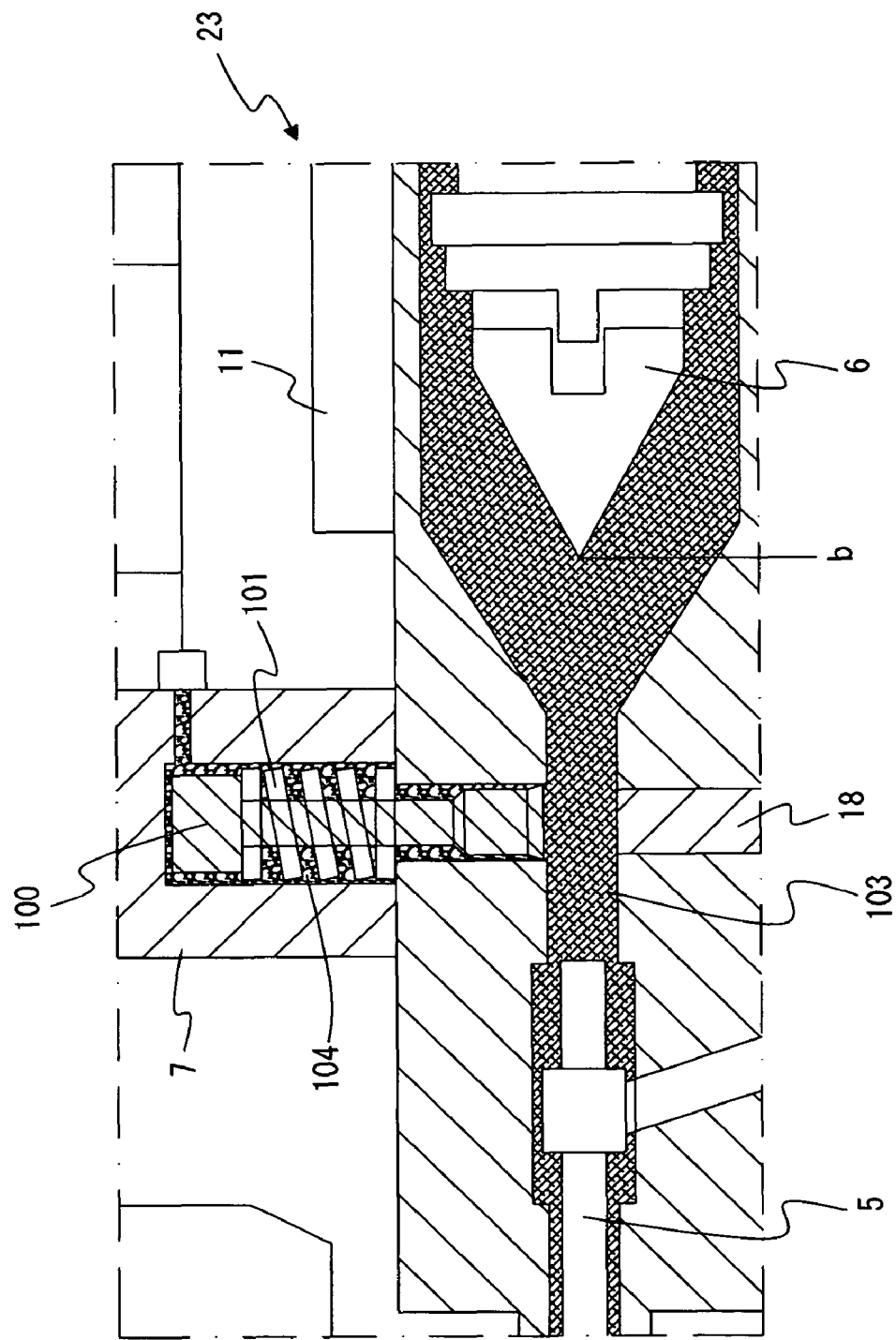
FIG. 3 is an enlarged view of the portion A surrounded by the dashed line in FIG. 1, and is a view for explaining the method of introducing the supercritical fluid into the plasticizing cylinder.
Figure 10:
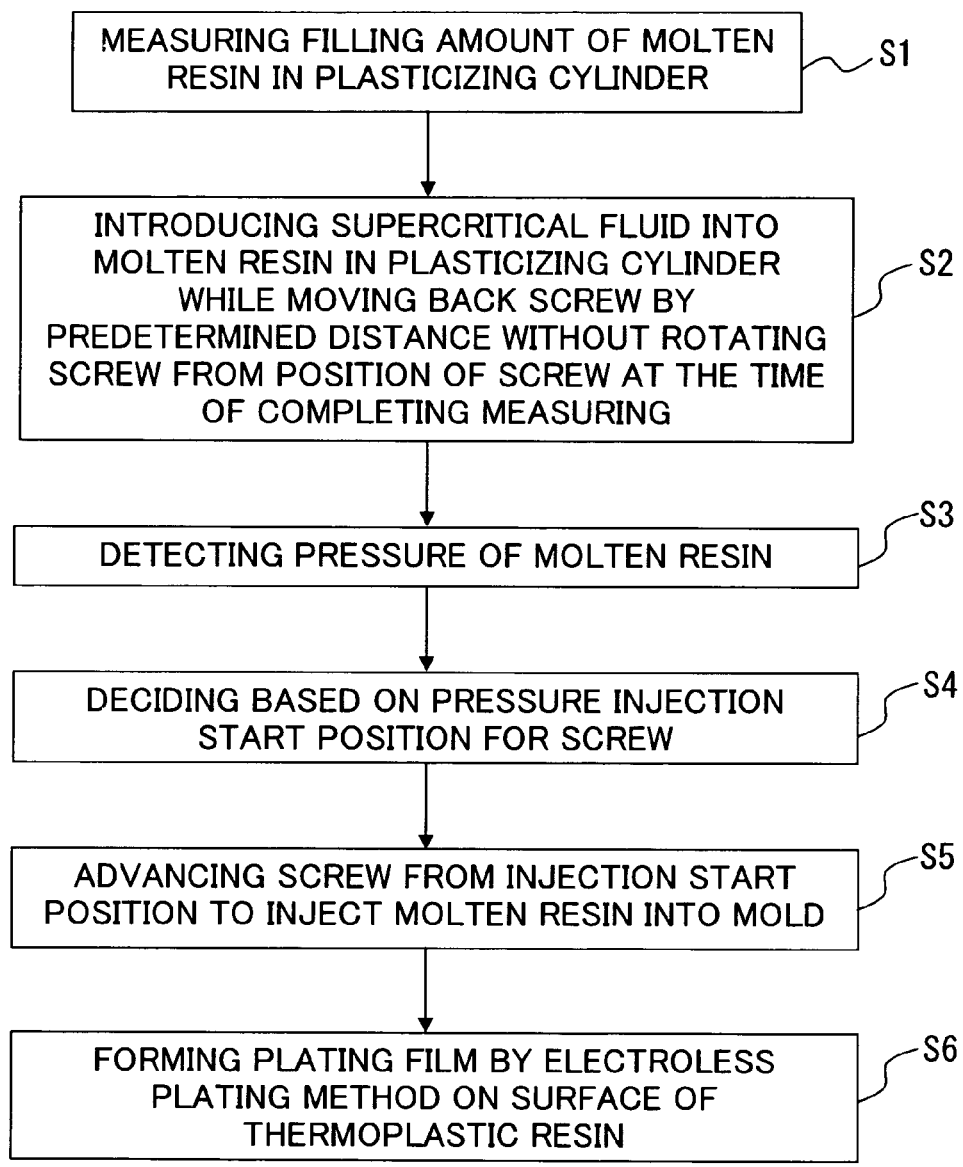
FIG. 10 is a flow chart for explaining the method of injection molding the molten resin and the method of forming a plating film on the molded article in Embodiment 1.

Next, as shown in FIG. 3, while the screw 6 is rotated and the molten resin is plasticized and measured, the tip of the screw 6 was made to reach a measurement completing position "b" (step S1 in FIG. 10). In this embodiment, the previous injection completing position "a" for the screw 6 was at 1±0.5 mm, and the measurement completing position "b" for the screw 6 was at 20 mm. Next, as shown by an arrow a1 in FIG. 4, the screw 6 was sucked back to a position "c" at 25 mm (the screw 6 was moved back without rotation). By this suck back, the pressure of the resin measured by the resin pressure sensor 18 was reduced from 10 MPa to 7 MPa.

Figure 4:
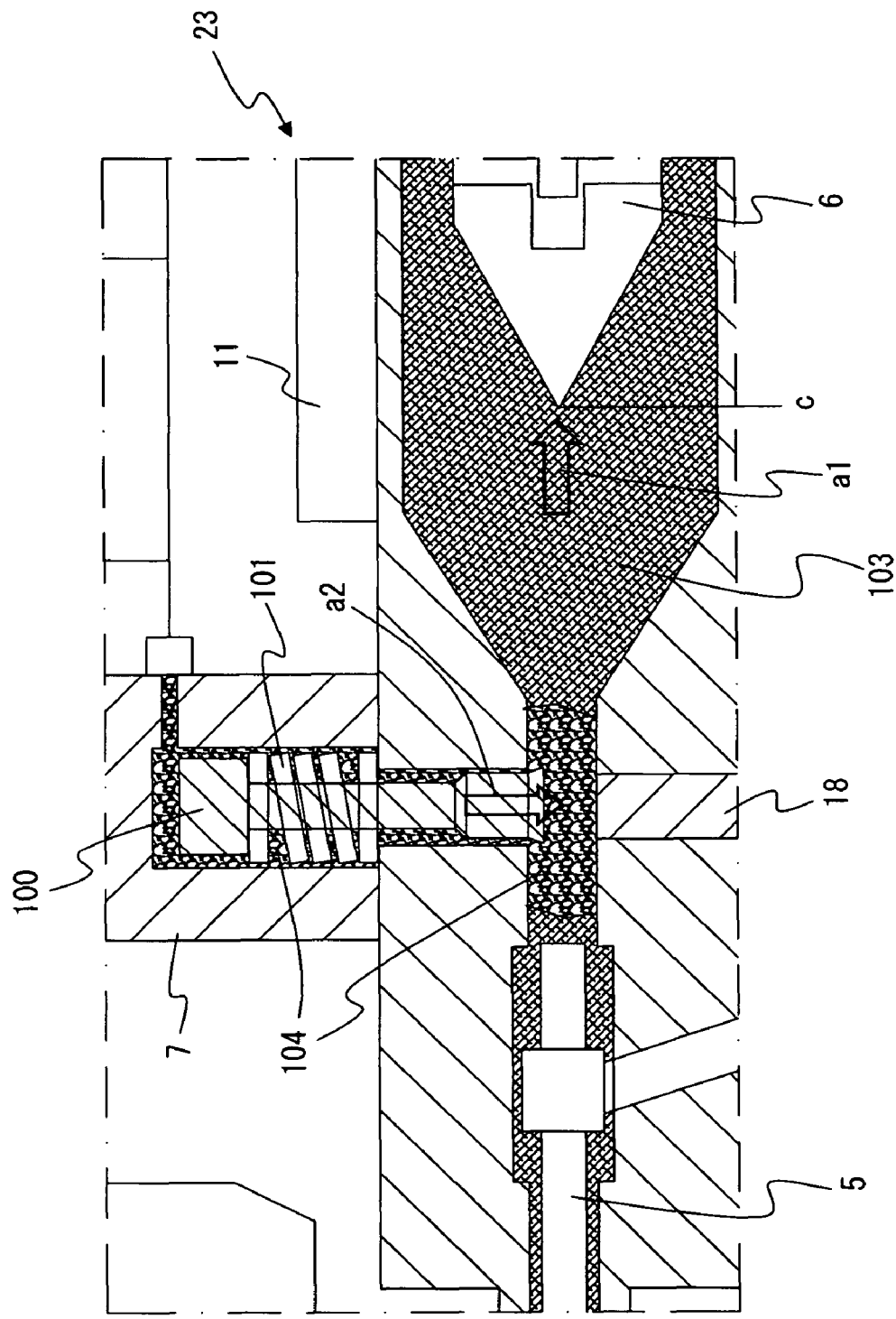
FIG. 4 is an enlarged view of the portion A surrounded by the dashed line in FIG. 1, and is a view for explaining the method of introducing the supercritical fluid into the plasticizing cylinder.

Further, simultaneously with the operation of sucking back, the automatic valve 3 of the supercritical fluid generating section 202 in FIG. 1 was opened, and the supercritical carbon dioxide 104 in which the metal complexes has been dissolved was introduced into the plasticizing cylinder 23 from the dissolving tank 2 via the gas introducing mechanism 7 (an arrow a2 in FIG. 4: step S2 in FIG. 10). At this time, as shown in FIG. 4, the seal piston 100 of the gas introducing mechanism 7 moved downward, and the supercritical carbon dioxide 104 is introduced in a vacuum area. During the introduction of the supercritical carbon dioxide 104, the pressure was increased so that the pressure meter 8 indicates 10 MPa. Further, a safety valve 9 is adjusted to operate at 20 MPa so that the pressure does not increase excessively.

Next, the injection start position of the screw 6 was determined by the position determining unit 40. Specifically, as shown in FIGS. 1 and 5, while the load cell motor which has the load cell 42 (pressure detector) and an electric motor 43 and which controls the screw 6 by a back pressure, is subjected to a feedback-control by the controller 41 so that the monitor value of the resin pressure sensor 18 becomes 12 MPa (step S3 in FIG. 10), the screw 6 was advanced (an arrow a3 in FIG. 5) to pressurize the inside of the plasticizing cylinder 23. Then, at the time when the monitor value of the resin pressure sensor 18 became 12 MPa±0.5 MPa, the screw 6 was stopped, and a position thereof was determined as an injection start position (step S4 in FIG. 10). In this embodiment, the injection start position "d" for the tip of the screw 6 was 19.5±0.2 mm. The feedback control of the pressure of the resin was performed for one minute.

FIG. 6 shows the entire appearance of the injection molding section 201 in a state that the screw 6 is stopped at the injection start position, and in this state, as shown in FIG. 6, the molten resin filled in the plasticizing cylinder 23 stays therein in a state of being macroscopically separated into molten resin 103 in which the supercritical carbon dioxide is barely impregnated and molten resin 105 in which a large amount of the supercritical carbon dioxide including the metal complexes (functional materials) is impregnated therein. In this embodiment, as shown in FIG. 6, since the introducing position (gas introducing mechanism 7) of the supercritical carbon dioxide is provided in the vicinity of a shut-off nozzle, a large amount of the supercritical carbon dioxide can stay in the flow-front portion of the molten resin. Further, in this embodiment, since the metal complexes which are thermally unstable and completely degrade at 150° C., are used as the functional materials (modifying materials) to be dissolved in the supercritical carbon dioxide, it is expected that the metal complexes dissolved in the supercritical carbon dioxide automatically degrade to become metallic fine particles in the molten resin.

Next, the molten resin was injected into the cavity 19 as follows. First, as shown in FIG. 7, the shut-off pin 5 was opened by the driving force of the air driving piston 10, and simultaneously the screw 6 was advanced by stroke control in an arrow a4 direction to perform a first filling of the molten resin (step S5 in FIG. 10). In the initial stage of the filling in the cavity 19, the supercritical carbon dioxide is partially gasified and discharged while an impregnation layer 105 of the supercritical carbon dioxide and the metallic fine particles flows into the cavity 19. At this time, the molten resin in the flow-front portion is filled while being elongated on a surface of the mold by a fountain flow effect, thereby forming a skin layer. Thereafter, the molten resin 103 layer in which the supercritical carbon dioxide is barely impregnated, is filled into the cavity 19 as a core layer for a molded article. At the time of filling the molten resin, since gas discharged from the molten resin in the flow-front portion may deteriorate a surface of the molded article, there may be adopted a method in which carbon dioxide or the like having a low pressure is filled in the cavity in advance as a counter pressure, and the carbon dioxide is discharged simultaneously with injection. Also, instead of the counter pressure, a dwell pressure or a clamping pressure maybe applied to the cavity. In either case, it is possible to prevent foaming in the molded article.

FIG. 8 schematically shows the appearance of the cavity 19 at the time of completing the first filling of the molten resin as described above. On the surface of the molded article, a solidified layer of resin in which the supercritical carbon dioxide and the metallic fine particles are impregnated and dispersed, is dominant, and therefore the molded article having a modified surface can be injection molded. Further, in this embodiment, after the molten resin was filled, the dwell pressure was applied to the cavity so as to complement a sink (dent generated on the surface of the molded article). Thus, a transparent molded article with no foam was obtained by the injection molding. As described above, in this embodiment, the injection molding and the surface modification of thermoplastic resin were performed at the same time.

Surface analysis by XPS was performed for the molded article which was injection molded in this embodiment, and as a result, a large amount of Pd as 0.2 at % (atomic percent) was detected. Further, when the analysis was performed similarly at a center portion of the molded article, the detected amount of Pd was 0.1 at % (atomic percent), and thus it was found that Pd barely exists in the center portion of the molded article. Namely, in the injection molding method in this embodiment, the functional materials (metallic fine particles) were dispersed only in the surface portion of the molded article.

Next, the molded article which was molded by the above injection molding method was immersed in an electroless Ni plating solution (NICORON DK produced by Okuno Chemical Industries Co., Ltd.) to form an Ni film (plating film) on the surface of the molded article (step S6 in FIG. 10). As a result, a glossy Ni film was evenly formed on the entire surface of the molded article. Adhesiveness of the plating film was examined after performing an accelerated environmental test, and it was found that sufficient adhesiveness is obtained.

Embodiment 2

In Embodiment 2, immediately after the injection filling of the molten resin in the cavity was completed, the movable mold was moved back by 0.1 mm. Namely, the step of complementing the resin by applying the dwell pressure to the cavity was not performed after the injection molding of the molten resin was completed. Except this point, the injection molding was performed in the same manner as in Embodiment 1. A molded article obtained in this embodiment had internal foams, but similarly to Embodiment 1, it was possible to form the electroless plating film on the surface of the molded article. Further, adhesiveness of the plating film was examined in the same manner as in Embodiment 1, and it was found that sufficient adhesiveness is obtained similarly to Embodiment 1.

Embodiment 3

In Embodiment 3, when injecting the molten resin into the cavity in the mold, injection molding was performed in a state that a counter pressure is applied to the cavity for decreasing a differential pressure between the pressure of the molten resin in the plasticizing cylinder and the pressure of the cavity in the mold.

Plastic Injection Molding Apparatus

Figure 9:
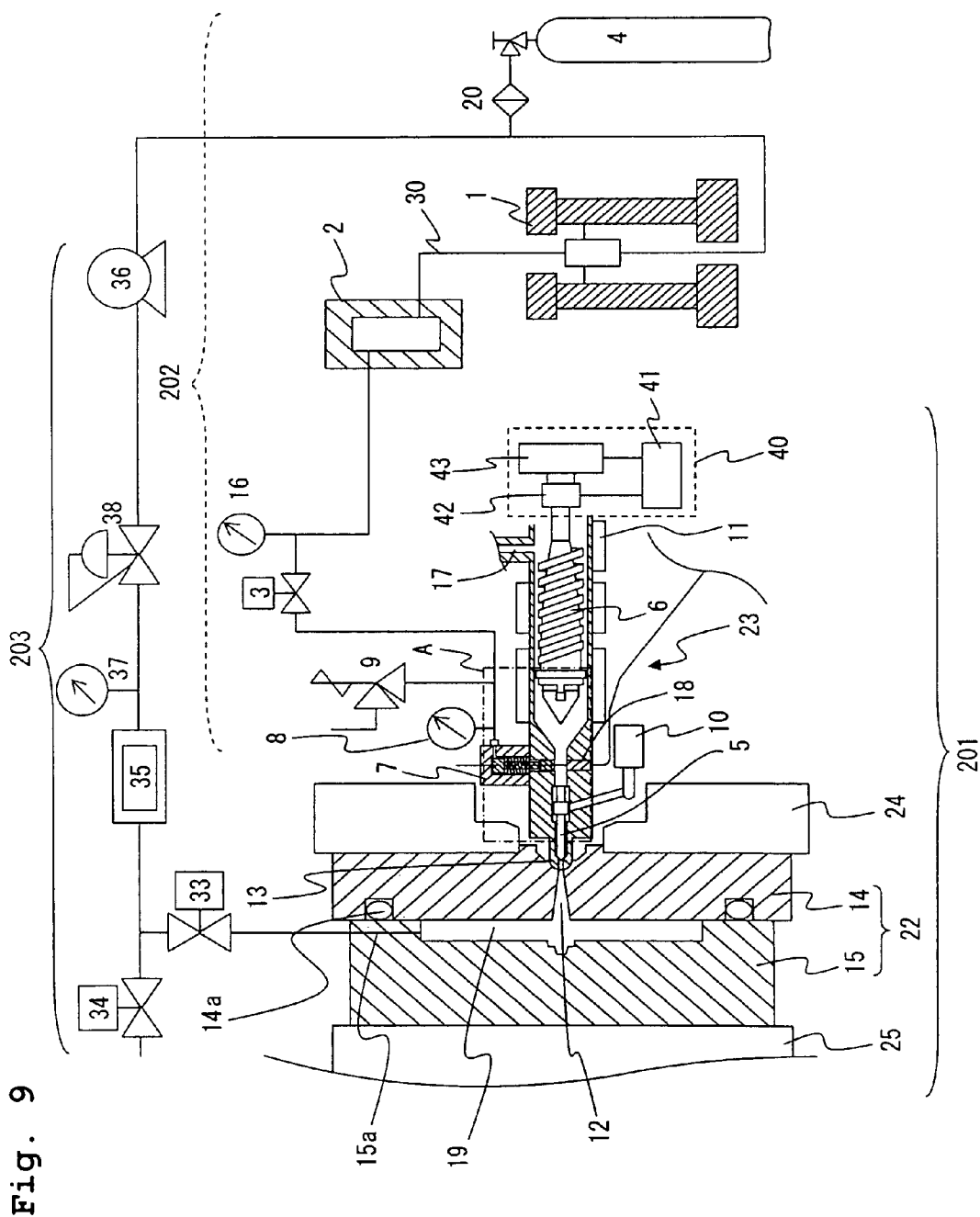
FIG. 9 is a schematic configuration diagram view of an apparatus used in an injection molding method of Embodiment 3.

First, a plastic injection molding apparatus used in this embodiment will be explained. A schematic configuration of the plastic injection molding apparatus used in this embodiment is shown in FIG. 9. As shown in FIG. 9, the plastic injection molding apparatus used in this embodiment includes an injection molding section 201, a supercritical fluid generating section 202, and a counter pressure introducing section 203.

As shown in FIG. 9, the injection molding section 201 is provided with a seal mechanism 14a on a surface, of the fixed mold 14, which makes contact with the movable mold 15 so that the cavity 19 has a sealed structure. Further, as shown in FIG. 9, the movable mold 15 is provided with an introducing path 15a for connecting the cavity 19 and the counter pressure introducing unit 203. When the counter pressure is applied to the cavity 19, carbon dioxide is introduced into the cavity 19 via the introducing path 15a. The other structure of the injection molding section 201 is the same as that of the injection molding section 201 of Embodiment 1 (see FIG. 1). Further, in this embodiment, for evaluating a transcription characteristic of a molded article, a fine pattern having a line width of 1 μm and a depth of 1 μm is formed in a surface on the cavity 19 side of the fixed mold 14. In this embodiment, the constitution of the supercritical fluid generating section 202 is the same as that of Embodiment 1.

As shown in FIG. 9, the counter pressure introducing section 203 includes mainly a booster pump 36 and a buffer tank 35, which are connected by a pipe. On the pipe, a pressure reducing valve 38 and valves 33, 34 for controlling introduction and discharge of carbon dioxide for a counter pressure are provided at predetermined positions. Further, in the counter pressure introducing section 203, as shown in FIG. 9, the booster pump 36 communicates with the carbon dioxide bottle 4 via the filter 20, and the buffer tank 35 communicates with the cavity 19 via the valve 33 and the introducing path 15a of the movable mold 15.

Injection Molding Method

Next, an injection molding method in this embodiment will be explained. First, carbon dioxide for a counter pressure was generated as follows. Note that as the gas for the counter pressure, any gas can be used as long as it is inert gas, and besides carbon dioxide, inert gas such as nitrogen, air, or the like can be used. First, carbon dioxide was supplied from the carbon dioxide bottle 4 to the booster pump 36, and the pressure of the carbon dioxide was increased by the booster pump 36, thereby generating pressurized carbon dioxide for a counter pressure. Next, the pressurized carbon dioxide was stored in the buffer tank 35 via the pressure reducing valve 38. At this time, the carbon dioxide was stored in the buffer tank 35 in a state that the pressure thereof is decreased so that the display of the pressure meter 37 shows 6 MPa.

Next, similarly to Embodiment 1, the supercritical carbon dioxide 104 which has the pressure of 10 MPa and in which the metal complexes is dissolved, was introduced from the dissolving tank 2 into the plasticizing cylinder 23 via the gas introducing mechanism 7. Then, the pressure of the resin was controlled by the load cell motor, which has the load cell 42 and the electric motor 43 as shown in FIG. 9, for detecting the pressure applied to the screw 6. Specifically, the screw 6 was advanced so that the pressure of the resin becomes 25 MPa (the arrow a3 in FIG. 5), thereby pressurizing the inside of the plasticizing cylinder 23. At this time, the stop position "d" for the tip of the screw 6 was 19.5±0.2 mm. By the pressurizing step with the screw 6, the supercritical carbon dioxide was impregnated in the molten resin. As in this embodiment, when the pressure of the molten resin is increased by pressure control of the screw 6 in step of impregnating the supercritical fluid into the molten resin, the supercritical fluid can be impregnate in the molten resin in a short period of time. In this embodiment, a period of time for impregnation of the supercritical carbon dioxide by pressurizing with the screw 6 was significantly reduced due to the high pressure of the resin, and was about five seconds.

Next, the screw 6 was rotated in reverse to decrease the pressure of the molten resin to 8 MPa, and was position-locked. A position of the tip of the screw 6 at this time was determined as the injection start position. However, in this embodiment, the injection start position for the screw 6 was the same as the stop position (19.5±0.2 mm) for the screw 6 in the above pressurizing step of the molten resin.

Next, the mold 22 was closed to form the sealed cavity 19. Then, the valve 33 of the counter pressure introducing section 203 was opened to introduce the carbon dioxide for the counter pressure of 6 MPa into the cavity 19 via the introducing path 15*a*. Then, the molten resin (has the pressure of 8 MPa) was injection filled in the cavity 19 in the same manner as in Embodiment 1. At this time, the molten resin was filled in the cavity 19 while discharging the carbon dioxide in the cavity 19 by opening the valve 34. Namely, in this embodiment, the differential pressure between the pressure of the molten resin in the plasticizing cylinder 23 before the injection filling and the counter pressure was set to 2 MPa (8 MPa−6 MPa) to perform the injection molding. Thereafter, similarly to Embodiment 1, the molded article was taken out from the mold.

As described above, when the pressure of the molten resin before the injection filling is decreased, the differential pressure between the pressure of the molten resin in the plasticizing cylinder 23 and the pressure in the cavity 19 can be made small, and thus it is possible to prevent foaming in the molten resin due to rapid decreasing in pressure and expansion in volume of the supercritical fluid during the injection filling. Therefore, according to the injection molding method in this embodiment, a molded article having an excellent surface characteristic (having no foam or the like) can be molded. Note that since the functional materials are dispersed inside the resin after the supercritical fluid is impregnated in the molten resin, the pressure of the resin during the injection filling may be at or lower than the critical pressure of the supercritical fluid.

Next, on a surface of the molded article molded by the above injection molding method, a plating film was formed on a surface of the molded article molded by the above injection molding method in the same manner as in Embodiment 1. As a result, a molded article having excellent adhesiveness was obtained similarly to Embodiment 1. Further, in this embodiment, a pattern transcription characteristic of the molded article was evaluated. As a result, a transcription ratio of a pattern on the surface of the molded article ((height of a groove of the molded article)/(depth of a groove of the mold)× 100) was 100%, and thus a favorable transcription was ensured.

Further, in this embodiment, the differential pressure between the pressure of the molten resin in the plasticizing cylinder 23 before the injection filling and the counter pressure, was changed to 3 MPa, 4 MPa and 5 MPa and injection molding was performed at each of these differential pressures in the same manner as the above-described method. Further, for comparison, the above evaluation test was also performed for a case of performing the injection molding without performing the reverse rotation operation of the screw 6, namely, without decreasing the pressure of the molten resin after the supercritical carbon dioxide is impregnated in the molten resin (differential pressure=25 MPa−6 MPa=19 MPa). As a result, transcription ratios of a pattern on the surface of the molding product were 99%, 95%, 90%, and 0% to 10% when the differential pressure was 3 MPa, 4 MPa, 5 MPa, and 19 MPa, respectively. From these results, it was found that the transcription ratio is higher as the differential pressure is smaller, and especially when the differential pressure is 5 MPa or lower, the transcription ratio of a pattern on the surface of the molded article becomes 90% or larger, thereby obtaining quite excellent transcription performance.

Foams were confirmed partially in the surface of the molded article that was injection molded with the differential pressure of 19 MPa, and it was found that the transcription characteristic had deteriorated due to generating foams. It is conceivable that, when the molten resin was injected into the cavity 19, the supercritical fluid impregnated in the resin rapidly expanded and gasified in the cavity to generate the foams since the pressure in the molten resin before filling is much higher than the pressure in the cavity 19.

Further, although not being shown here, as a result of performing injection molding while changing the differential pressure by the present inventors, the transcription ratio of the pattern on the surface of the molded article became 80% or larger by setting the differential pressure to 10 MPa or smaller, and thus favorable transcription performance was obtained. However, when the differential pressure was set smaller than 1 MPa, it became difficult to inject the molten resin into the cavity.

Embodiment 4

In Embodiment 4, the injection molding was performed considering a differential pressure between the pressure of the molten resin in the plasticizing cylinder before filling and the pressure in the cavity, similarly to Embodiment 3. However, in this embodiment, the injection molding was performed by adjusting the differential pressure by not applying the counter pressure into the cavity and lowering as much as possible the pressure of the molten resin in the plasticizing cylinder before the injection filling.

Injection Molding Method

The injection molding method in this embodiment is as follows. However, in this example, the same apparatus as in Embodiment 1 (see FIG. 1) was used for surface modification and injection molding of thermoplastic resin.

First, the molten resin was plasticized and measured in the same manner as in Embodiment 1, and before the molten resin reaches a desired filling amount, the plasticizing and measuring were stopped once (first plasticizing and measuring). In this embodiment, at a 10 mm-position (first plasticizing and measuring position), which is shorter by 10 mm than a 20 mm-position at which the plasticizing and measuring are completed in Embodiment 1, the screw 6 was stopped and the measuring was stopped temporarily.

Then, the screw 6 was sucked back and moved back to the position of 15 mm, and simultaneously the supercritical carbon dioxide 104 which has the pressure of 10 MPa and in which the metal complexes are dissolved, was introduced from the dissolving tank 2 into the plasticizing cylinder 23 via the gas introducing mechanism 7. Next, the screw 6 was advanced to pressurize the inside of the plasticizing cylinder 23. At this time, the pressure of the molten resin was feedback-controlled by the load cell motor which includes the load cell 42 and the electric motor 43 and which detects a pressure applied to the screw 6 so that the pressure of the molten resin becomes 25 MPa. Then, when the pressure of the molten resin became 25 MPa, movement of the screw 6 was stopped. The stop position "d" for the tip of the screw 6 at this time was 10.5±0.2 mm. By this pressurizing step of the molten resin, the supercritical carbon dioxide 104 was impregnated in the molten resin. A period of time for pressurizing and impregnating the supercritical carbon dioxide at this time was four seconds.

Next, the screw 6 was rotated to additionally plasticize and melt the resin, and the molten resin was filled in the plasticizing cylinder 23 (second plasticizing and measuring). Namely, the measuring of the molten resin was restarted. Then, the screw 6 was stopped at a predetermined position (second plasticizing and measuring completing position). At this time, the screw 6 was stopped by stroke control. Specifically, the stop position for the screw 6 was set to a position 20.5 mm±0.5 mm, which is moved back by 10 mm from the stop position (10 mm) for the screw 6 at the time of impregnating the supercritical fluid, and this stop position was determined as the injection start position. At this time, the back-pressure control of the screw 6 was performed at 3 MPa. By this step, the pressure of the molten resin in the plasticizing cylinder 23 was decreased to 3 MPa (the differential pressure between the pressure of the molten resin in the plasticizing cylinder 23 and the pressure of the cavity 19 was made small).

Next, in the same manner as in Embodiment 1, the screw 6 was advanced from the above injection start position by stroke control, and the molten resin was injection filled in the cavity 19. Then, after injection molding of the molten resin, the molded article was taken out of the mold 22 in the same manner as in Embodiment 1.

The molded article obtained in the above-described method was examined. As a result, similarly to Embodiment 1, a molded article having an excellent surface characteristic (having no foam or sink) was obtained. From this result, it was found that the molded article having the excellent surface characteristic similarly to Embodiment 1 can be obtained by decreasing the pressure of the molten resin at the time of the injection filling as in this embodiment, without applying the dwell pressure to the mold after the injection filling as in Embodiment 1.

As described above, in the injection molding method of this embodiment, the plasticizing and measuring are stopped once, the molten resin is pressurized in this state so as to impregnate the supercritical fluid therein in a short period of time, and thereafter the plasticizing and measuring are continued further under the condition of reduced pressure, thereby lowering the pressure of the molten resin to perform injection molding. In this case, since the modifying materials such as metal complexes or the like are diffused in the molten resin in a short period of time, there are hardly cases that the uniformity of mixing and kneading of the modifying materials deteriorates even when the molten resin is depressurized thereafter. Further, in the method of this embodiment, the density of the supercritical fluid becomes small, and thus foaming due to rapid reduction in pressure of the supercritical fluid can be prevented when the molten resin is injection filled in the mold having a low pressure atmosphere.

Next, on a surface of the molded article molded by the above injection molding method, a plating film was formed in the same manner as in Embodiment 1. As a result, similarly to Embodiment 1, an electroless plating film having excellent adhesiveness was formed on the molded article produced in this embodiment.

Embodiment 5

In this embodiment, a method of forming a plating film with a predetermined pattern on the surface of the molded article molded by the injection molding method in the above-described Embodiment 1, will be explained.

First, after the molded article was molded in the same manner as in Embodiment 1, a masking tape having a line width of 1 mm was adhered on the surface of the molded article to form a mask. Thereafter, electroless plating treatment was performed in the same manner as in Embodiment 1 to form a plating film. Then, the masking tape was removed. As a result, the plating film was formed on an area of the surface of the molded article other than the area on which the masking tape was adhered.

Conductivity of the molded article molded by the above method was examined in the area where the plating film was formed and the area where the masking tape was adhered (area where the plating film is not formed). As a result, the area where the plating film was formed, exhibited conductivity, but the area where the masking tape was adhered, did not exhibit conductivity. It is conceivable that this result is due to the following reasons.

The present inventors examined distribution of dispersion of metallic fine particles (modifying material) in the surface of the molded article (molded article before the plating film is formed thereon) which was formed by the injection molding method in this embodiment. As a result, it was found that the metallic fine particles were distributed in an island shape, and the metallic fine particles were distributed without having conductivity in the surface of the molded article. Accordingly, it is conceivable that the conductivity was not exhibited in the area where the masking tape was adhered because the metallic fine particles are dispersed in the island shape. From the above result, it was found that when metallic fine particles are dispersed in the surface of a molded article using the injection molding method of the present invention and a plating film is formed on the surface of the molded article by the electroless plating method, a plane and three-dimensional electric wiring formed of a plating film can be formed easily on the molded article by masking an arbitrary area on the molded article.

Comparative Embodiment 1

In Comparative Embodiment 1, movement control of the screw 6 was performed by a control method such that, without the feedback control of the pressure of resin measured by the resin pressure sensor 18 after the suck back, and the screw position is moved back by an arbitrary pressure in each shot to a predetermined position of the plasticization completing position, and then the screw 6 advances to the injection start position to perform the injection filling. Except this point, the injection molding was performed and a plating film was formed in the same manner as in Embodiment 1. As a result, bubbles and scattering powder of the resin were confirmed on an outer peripheral end and a portion of a surface of the molded article produced in Comparative Embodiment 1. Further, in Comparative Embodiment 1, numbers of thermoplastic resin was molded and density of the functional materials (metallic fine particles) impregnated in the thermoplastic resin was examined in all the molded articles. As a result, the density of the functional materials impregnated in each of the molded articles varied depending on positions inside each of the molded articles, and the density distribution of the functional materials in the molded articles was different in each of the molded articles. Namely, by the method of Comparative Embodiment 1, a desired molded article in which the surface thereof is modified could not be produced stably. It is conceivable that, in Comparative Embodiment 1, since the screw 6 was advanced to the injection start position without feedback control of the pressure of resin measured by the resin pressure sensor 18, the pressure of the molten resin inside the plasticizing cylinder could not be uniformed by the pressing pressure of the screw, thereby generating the separation of the supercritical carbon dioxide from the molten resin.

In the above-described Embodiment 1, the injection molding method for producing a molded article having no foam is explained, but the injection molding method can be used also for producing a molded article having internal foams. In this case, foams can be produced in a portion (particularly the inside) of the molded article by lowering the internal pressure of the resin when the molten resin is injected in the cavity.

According to the injection molding method of the present invention, the supercritical fluid can be stably impregnated partially in molten resin in a plasticizing cylinder of an injection molding apparatus. Further, when the supercritical fluid including functional materials is impregnated in the flow-front portion of the molten resin, the functional materials can be dispersed in a surface of the molded article to modify the surface by just injecting the molten resin into a cavity. Therefore, the injection molding method of the present invention is favorable as a method for performing the surface modification of the thermoplastic resin using the supercritical fluid as a solvent and the injection molding process simultaneously. In particular, when using metal complexes as the functional material, the present invention is more favorable because a clean pre-treatment process for electroless plating and the injection molding process can be performed at the same time.

What is claimed is:

1. A method of injection molding for producing an article of which a surface has no foam using an injection molding apparatus comprising
a mold and a plasticizing cylinder having a screw, the plasticizing cylinder injecting molten resin of thermoplastic resin into the mold by the screw, the method comprising:
measuring a filling amount of the molten resin in the plasticizing cylinder;
introducing a supercritical fluid into the molten resin in the plasticizing cylinder simultaneously with moving back the screw by a predetermined distance without rotating the screw from a position of the screw at the time of completing the measuring;
detecting a pressure of the molten resin;
determining, based on the pressure, an injection start position for the screw; and
advancing the screw from the injection start position to inject the molten resin into the mold without applying a counter pressure to the mold,
wherein the determining of the injection start position for the screw includes pressurizing the molten resin by advancing the screw in a direction that the molten resin is injected into the mold and depressurizing the molten resin after the pressurizing of the molten resin so that a differential pressure between the pressure of the molten resin in the plasticizing cylinder and a pressure inside the mold is 1 MPa to 5 MPa thereby producing the article of which the surface has no foam.

2. The method of injection molding according to claim 1, wherein the injection start position for the screw is different from the position of the screw at the time of completing the measuring.

3. The method of injection molding according to claim 1, wherein a movement of the screw during the advancing is stroke-controlled.

4. The method of injection molding according to claim 3, further comprising applying a dwell pressure to the molten resin after the molten resin is filled in the mold.

5. The method of injection molding according to claim 1, wherein the supercritical fluid includes a functional material.

6. The method of injection molding according to claim 5, wherein the supercritical fluid is introduced into a flow-front portion of the molten resin in the plasticizing cylinder.

7. The method of injection molding according to claim 5, wherein the functional material is metallic fine particles.

8. A method of forming a plating film on thermoplastic resin, the method comprising:
molding, by the method of injection molding as defined in claim 7, thermoplastic resin in which metallic fine particles are dispersed in a surface thereof; and
forming a plating film by an electroless plating method on the surface of the thermoplastic resin in which the metallic fine particles are dispersed.

9. The method of injection molding according to claim 1, wherein the determining of the injection start position for the screw includes pressurizing the molten resin by advancing the screw in the direction that the molten resin is injected into the mold and depressurizing the molten resin under a critical pressure of the supercritical fluid to a pressure below the critical pressure after the pressurizing of the molten resin so that the differential pressure between the pressure of the molten resin in the plasticizing cylinder and the pressure inside the mold is 1 MPa to 5 MPa.

* * * * *